United States Patent
Hoshikawa et al.

(10) Patent No.: US 7,238,735 B2
(45) Date of Patent: Jul. 3, 2007

(54) PROCESS FOR PRODUCING AQUEOUS DISPERSION OF PURIFIED POLYTETRAFLUOROETHYLENE

(75) Inventors: Jun Hoshikawa, Ichihara (JP); Shinya Higuchi, Ichihara (JP); Yasuhiko Matsuoka, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/282,624

(22) Filed: Nov. 21, 2005

(65) Prior Publication Data

US 2007/0043164 A1  Feb. 22, 2007

(30) Foreign Application Priority Data

Aug. 19, 2005  (JP)  ............................. 2005-239062

(51) Int. Cl.
*C08F 1/00* (2006.01)
(52) U.S. Cl. ...................... 523/310; 524/544; 554/191; 526/243; 210/662
(58) Field of Classification Search ................ 523/310; 524/544; 554/191; 526/243; 210/662
See application file for complete search history.

(56) References Cited

U.S. PATENT DOCUMENTS

| | | | | |
|---|---|---|---|---|
| 4,999,131 A | * | 3/1991 | Shimizu et al. ................ 516/53 |
| 5,164,080 A | * | 11/1992 | Furuno .................... 210/195.1 |
| 6,825,250 B2 | * | 11/2004 | Epsch et al. ................. 523/310 |
| 6,833,403 B1 | * | 12/2004 | Blädel et al. ................ 524/458 |
| 6,861,466 B2 | * | 3/2005 | Dadalas et al. .............. 524/544 |
| 2002/0168773 A1 | * | 11/2002 | Ito et al. ........................ 436/37 |
| 2005/0189299 A1 | * | 9/2005 | Malvasi et al. .............. 210/663 |
| 2006/0128872 A1 | * | 6/2006 | Zipplies et al. ............. 524/545 |
| 2006/0135654 A1 | * | 6/2006 | Swearingen et al. ........ 523/310 |
| 2006/0175261 A1 | * | 8/2006 | Noelke et al. ............... 210/662 |
| 2006/0183842 A1 | * | 8/2006 | Johnson ...................... 524/544 |

FOREIGN PATENT DOCUMENTS

| | | |
|---|---|---|
| JP | 2001-62313 | 3/2001 |
| JP | 2002-532583 | 10/2002 |
| JP | 2005-200650 | 7/2005 |
| WO | WO 00/35971 | 6/2000 |

OTHER PUBLICATIONS

"Handbook of Fluorine resins", published by Nikkankogyo Shimbun, pp. 28-29, 1990.
Takeshi Suwa, et al., "Melting and Crystallization Behavior of Poly (tetrafluoroethylene). New Method for Molecular Weight Measurement of Poly (tetrafluoroethylene) Using a Differential Scanning Calorimeter", Journal of Applied Polymer Science, vol. 17, 1973, pp. 3253-3257.
"Handbook of Fluorine resins", published by Nikkankogyo Shimbun, pp. 32-33, 1990.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A process for producing an aqueous dispersion of purified polytetrafluoroethylene (PTFE), comprising passing a crude aqueous dispersion of PTFE comprising from 10 to 50 mass % of PTFE fine particles having an average particle diameter of from 0.1 to 0.5 μm, from 0.05 to 1.0 mass %, based on PTFE, of a fluorine-containing carboxylic acid salt (APFO) and from 2 to 20 mass %, based on PTFE, of a nonionic surfactant through a column packed with a weak basic AER upward at a linear velocity of 0.1 to 2 mm/sec with a contact time of 0.2 to 4 hours to reduce the APFO concentration. The process can increase the absorption of APFO by the anion exchange resin, prevents agglomeration of PTFE during passage and makes it easy to elute the absorbed APFO.

14 Claims, No Drawings

PROCESS FOR PRODUCING AQUEOUS DISPERSION OF PURIFIED POLYTETRAFLUOROETHYLENE

TECHNICAL FIELD

The present invention relates to a process for producing an aqueous dispersion of tetrafluoroethylene (hereinafter referred to as PTFE).

BACKGROUND ART

An emulsion polymerized PTFE is obtained by polymerizing the tetrafluoroethylene (hereinafter referred to as TFE) monomer, in the presence of pure water, a polymerization initiator, a fluorine-containing anionic surfactant (hereinafter referred to as APFO) such as ammonium perfluorooctanoate and a paraffin wax stabilizer, and it is obtained as an aqueous PTFE polymer emulsion containing PTFE fine particles (Handbook of Fluorine resins, p. 28, edited by Takaomi Satokawa, published by Nikkankogyo Shimbun).

The aqueous PTFE polymer emulsion after the polymerization is used as a crude aqueous PTFE dispersion after blended with a nonionic surfactant, or as a blended aqueous dispersion of PTFE after blended with a nonionic surfactant, a filler or other known components as the case requires. However, it has not been industrially common to remove APFO from an aqueous dispersion of PTFE. Because APFO is hardly naturally degradable, it is preferred to minimize the APFO content of products.

As to means of lowering the APFO content, WO00/35971 (JP-A-2002-532583) proposes a method of preparing an aqueous dispersion of PTFE with a low APFO concentration by passing a crude aqueous dispersion of PTFE through a column packed with an anion exchange resin (hereinafter referred to as AER) and allowing the AER to absorb APFO. In this method, it is important to increase the APFO absorption per AER to lower costs because the AER is generally expensive. However, The APFO absorption disclosed in WO00/35971 is relatively low at the level of less than 16% of the theoretical capacity, and there is no disclosure about how to increase the absorption. Further, because strong basic AERs are used in the Examples, there is a problem that the efficiency of the removal of APFO tends to decrease during continuous passage of a crude aqueous dispersion of PTFE due to agglomeration of the PTFE fine particles in the column.

Besides, though it is not disclosed how to feed the crude aqueous dispersion of PTFE to the column, when an ordinary mechanical pump which generates shearing force is used to feed the dispersion, there is a problem that agglomerates of PTFE fine particles accumulate in the AER column to hinder removal of APFO. Though it is preferred to elute the APFO absorbed by the AER with an eluent such as an alkaline solution for reuse, there is a problem that the strong basic AER used in the Examples absorbs APFO too strong to elute APFO.

DISCLOSURE OF THE INVENTION

Problems that the Invention is to Solve

The object of the present invention is to provide a process for producing an aqueous dispersion of purified polytetrafluoroethylene, with increased APFO absorption by AER and easy elution of the absorbed APFO without agglomeration of PTFE during passage.

Means for Solving the Problems

As a result of their extensive research, the present inventors have found that the above-mentioned object can be attained by passing a specific crude aqueous dispersion of PTFE through a column packed with a weak basic AER by a specific feeding method and a specific pressurizing means and have accomplished the present invention.

Namely, the present invention provides a process for producing an aqueous dispersion of purified PTFE, which comprises passing a crude aqueous dispersion of PTFE comprising from 10 to 50 mass % of PTFE fine particles having an average particle diameter of from 0.1 to 0.5 μm, from 0.05 to 1.0 mass %, based on PTFE, of APFO represented by the formula (1) and from 2 to 20 mass %, based on PTFE, of a nonionic surfactant represented by the formula (2) and/or the formula (3) through a column packed with a weak anion exchange resin upward at a linear velocity of 0.1 to 2 mm/sec with a contact time of 0.2 to 4 hours to reduce the content of the APFO:

formula 1): $R^1$—COOX (wherein $R^1$ is a $C_{5-9}$ alkyl group having fluorine atoms instead of from 90 to 100% of the hydrogen atoms (which may contain from 1 to 2 ether oxygen atoms), and X is an ammonium ion);

formula 2): $R^2$—O—A—H (wherein $R^2$ is a $C_{8-18}$ alkyl group, and A is a polyoxyalkylene chain consisting of from 5 to 20 oxyethylene groups and from 0 to 2 oxypropylene groups); and formula 3): $R^3$—$C_6H_4$—O—B—H (wherein $R^3$ is a $C_{4-12}$ alkyl group, and B is a polyoxyalkylene chain consisting of from 5 to 20 oxyethylene groups).

The present invention also provides the process for producing an aqueous dispersion of purified PTFE according to Claim 1, wherein the APFO content in the aqueous dispersion of purified PTFE is from 0.001 to 0.02 mass % based on PTFE.

The present invention also provides the process for producing an aqueous dispersion of purified PTFE according to Claim 1 or 2, wherein the crude aqueous dispersion of PTFE is passed through plural columns connected in tandem, and when the pH of the aqueous dispersion of purified PTFE from the last column becomes 7 or below, the first column is removed, and a new column is installed as the last column, and then the crude aqueous dispersion of PTFE is passed through the tandem of plural columns.

The present invention further provides the process for producing an aqueous dispersion of purified PTFE wherein the crude aqueous dispersion of PTFE is supplied to the column by a pressurizing means which generates no substantial shearing force.

EFFECTS OF THE INVENTION

The process for producing aqueous dispersion of purified PTFE of the present invention can increase absorption of APFO by an AER, prevent formation of agglomerates during passage and produce an aqueous dispersion of purified PTFE at low cost. Further, it makes it easy to elute APFE from the AER at a high yield and reuse the APFO.

BEST MODE FOR CARRYING OUT THE INVENTION

The crude aqueous dispersion of PTFE to be used in the present invention comprises from 10 to 50 mass % of PTFE fine particles having an average particle diameter of from 0.1 to 0.5 μm, from 0.05 to 1.0 mass %, based on PTFE, of an APFO represented by the formula (1) and from 2 to 20 mass %, based on PTFE, of a nonionic surfactant represented by the formula (2) and/or the formula (3).

The PTFE fine particles are those obtained by emulsion polymerization having an average particle diameter of from 0.1 to 0.50 μm, preferably from 0.15 to 0.40 μm, particularly preferably from 0.20 to 0.35 μm. If the average particle diameter is smaller than 0.10 μm, the PTFE has a low molecular weight and mechanically weak as PTFE products, and PTFE fine particles having an average particle diameter larger than 0.50 μm are not preferable because they sediment so fast that the storage stability deteriorates.

The number average molecular weight of PTFE is preferably from 500,000 to 30,000,000, particularly preferably from 1,000,000 to 25,000,000, though it can be selected arbitrary. If the number average molecular weight is smaller than 500,000, the PTFE is mechanically weak, and PTFE having a number average molecular weight larger than 30,000,000 is difficult to produce industrially.

The number average molecular weight is calculated from the heat of crystallization by the method of Suwa et al. (Journal of Applied Polymer Science, 17, 3253 (1973)).

In the present invention, PTFE includes not only a homopolymer of TFE, but also so-called modified PTFE containing polymerized units derived from a comonomer component copolymerizable with TFE, for example, a halogenated ethylene such as chlorotrifluoroethylene, a halogenated propylene such as hexafluoropropylene or a fluorovinyl ether such as a perfluoro(alkyl vinyl ether), in such a small amount that melt-processing is substantially impossible.

The PTFE fine particles are preferably obtained as an aqueous PTFE polymer emulsion by polymerizing the TFE monomer injected under a pressure of from 2 to 50 atm, in the presence of pure water, a polymerization initiator, APFO and a paraffin wax stabilizer.

The polymerization initiator may be a persulfate salt such as ammonium perfulfate or potassium persulfate, a water-soluble peroxide such as disuccinyl peroxide, digultaryl peroxide or tert-butyl hydroperoxide, a redox polymerization initiator such as a combination of a chlorate, bromate or permanganate with a reducing agent.

The crude aqueous dispersion of PTFE has a PTFE concentration of from 10 to 50 mass %, preferably from 15 to 40 mass %, particularly preferably from 20 to 30 mass %. It is not preferred that the PTFE concentration is lower than 10 mass % because the viscosity would be so low that the PTFE fine particles would sediment in the column or a storage tank, and it is not preferred that the PTFE concentration is higher than 50 mass %, either, because the viscosity would be so high as to increase the flow resistance through the column.

The APFO to be used in the present invention is represented by the formula (1).

Formula (1) $R^1$—COOX (wherein $R^1$ is a $C_{5-9}$ alkyl group having fluorine atoms instead of from 90 to 100% of the hydrogen atoms (which may contain from 1 to 2 ether oxygen atoms), and X is an ammonium ion)

Specific examples of the APFO of the formula (1) include $C_7F_{15}COONH_4$, $HC_7F_{14}COONH_4$, $C_6F_{13}COONH_4$, $HC_6F_{12}COONH_4$, $C_8F_{17}COONH_4$, $C_4F_9OC_2F_4OCF_2COONH_4$, $HC_4F_8OC_2F_4OCF_2COONH_4$ and the like. The APFO is preferably an ammonium perfluorocarboxylate, and $C_7F_{15}COONH_4$ (ammonium perfluorooctanoate) is preferred most because it stabilizes the polymerization process. APFOs of the formula (1) may be used singly or in combination of two or more.

The APFO is used in an amount of from 0.05 to 1.0 mass %, preferably from 0.1 to 0.5 mass %, particularly preferably from 0.15 to 0.3 mass %, based on PTFE, when the TFE monomer is polymerized. If the APFO is used in an amount of less than 0.05 mass % in the polymerization, the product yield is low due to agglomeration of PTFE fine particles, and if the amount is larger than 1.0 mass %, PTFE is hardly obtained in the form of fine particles.

The nonionic surfactant to be used in the present invention is represented by the formula (2) and/or the formula (3).

Formula (2) $R^2$—O—A—H (wherein $R^2$ is a $C_{8-18}$ alkyl group, and A is a polyoxyalkylene chain consisting of from 5 to 20 oxyethylene groups and from 0 to 2 oxypropylene groups)

Formula (3) $R^3$—$C_6H_4$—O—B—H (wherein $R^3$ is a $C_{4-12}$ alkyl group, and B is a polyoxyalkylene chain consisting of from 5 to 20 oxyethylene groups)

In the formula (2), the alkyl group as $R^2$ has a carbon number of from 8 to 18, preferably from 10 to 16, particularly preferably from 12 to 16. If the carbon number is larger than 18, the surfactant has a high pour point and is difficult to handle, and the PTFE aqueous dispersion tends to have poor storage stability because the PTFE fine particles readily sediment when the PTFE aqueous dispersion is left to stand for a long time. If the carbon number is smaller than 8, the PTFE aqueous dispersion has a high surface tension and has poor wettability when applied to form a coating.

In the formula (2), the hydrophilic group A is a polyoxyalkylene chain consisting of from 5 to 20 oxyethylene groups and from 0 to 2 oxypropylene groups, preferably consisting of from 7 to 12 oxyethylene groups and from 0 to 2 oxypropylene groups, in view of viscosity and stability. Especially, it is preferred that the hydrophilic group A has from 0.5 to 1.5 oxypropylene groups because the defoaming property is good.

In the formula (3), the alkyl group as $R^3$ has a carbon number of from 4 to 12, preferably from 6 to 10, particularly preferably from 8 to 9. If the alkyl group has a carbon number smaller than 4, the PTFE aqueous dispersion has a high surface tension and has poor wettability, and if the carbon number is larger than 12, the PTFE aqueous dispersion tends to have poor storage stability because the PTFE fine particles readily sediment when the PTFE aqueous dispersion is left to stand for a long time.

In the formula (3), the hydrophilic group B is a polyoxyalkylene chain consisting of from 5 to 20 oxyethylene groups, preferably consisting of from 6 to 16 oxyethylene groups, particularly preferably from 7 to 12 oxyethylene groups, in view of viscosity and stability.

The nonionic surfactant of the formula (2) or the formula (3) preferably has an average molecular weight of from 450 to 800, more preferably from 500 to 750, particularly preferably from 550 to 750. A surfactant having an average molecular weight larger than 800 is not preferable because it would have a high pour point and would be difficult to handle. A surfactant having an average molecular weight smaller than 450 is not preferable either, because the PTFE aqueous dispersion would have poor wettability when applied to form a coating.

Specific examples of the nonionic surfactant of the formula (2) include nonionic surfactants having molecular structures such as $C_{13}H_{27}$—$(OC_2H_4)_{10}$—OH, $C_{12}H_{25}$—$(OC_2H_4)_{10}$—OH, $C_{10}H_{21}CH(CH_3)CH_2$—$(OC_2H_4)_9$—OH, $C_{13}H_{27}$—$(OC_2H_4)_9$—$OCH(CH_3)CH_2$—OH, $C_{16}H_{33}$—$(OC_2H_4)_{10}$—OH and $HC(C_5H_{11})(C_7H_{15})$—$(OC_2H_4)_9$—OH and commercial products such as the TERGITOL (registered trademark) 15 series manufactured by Dow and the LIONOL (registered trademark) TD series manufactured by Lion.

Specific examples of the nonionic surfactant of the formula (3) include nonionic surfactants having molecular structures such as $C_8H_{17}$—$C_6H_4$—$(OC_2H_4)_{10}$—OH and $C_9H_{19}$—$C_6H_4$—$(OC_2H_4)_{10}$—OH and commercial products such as the Triton (registered trademark) X series manufactured by Dow and the NIKKOL (registered trademark) OP and NP series manufactured by Nikko Chemicals. Nonionic surfactants of the formula (2) and/or the formula (3) may be used singly or in combination of two or more.

Since a nonionic surfactant is a mixture of at least two substances having different molecular structures, the carbon number of the alkyl groups and the numbers of the oxyethylene groups and oxypropylene groups in the polyoxyalkylene chain in a nonionic surfactant are averaged out herein and, therefore, may not be integers.

In the present invention, the content of the nonionic surfactant of the formula (2) and/or the formula (3) in the crude aqueous dispersion of PTFE contains is from 2 to 20 mass %, preferably from 2.5 to 18 mass %, particularly preferably from 2.5 to 16 mass %, based on PTFE. If the content is less than 2 mass %, the PTFE fine particles tend to adhere to the surfaces of the weak basic AER particles in the column to make the APFO removal less efficient and clog the column. It is not economical that the content is larger than 20 mass %, and it would unfavorably require an increased load to decompose the surfactant in the supernatant obtained in the concentration step.

The pH of the crude aqueous dispersion of PTFE is preferably from 2 to 6, more preferably from 3 to 5, particularly preferably from 3 to 4. If the pH were lower than 2, the crude aqueous dispersion of PTFE would be instable, and the weak basic AER would be less absorptive. If the pH were higher than 6, the decrease in the ion exchange capacity is hard to detect because the pH of the aqueous dispersion of purified PTFE eluted from the column is used as the indicator of the ion exchange capacity of the weak basic AER in the present invention.

In the present invention, the APFO concentration in the aqueous dispersion of purified PTFE is preferably at most 0.02 mass %, more preferably 0.001 to 0.02 mass %, further more preferably from 0.002 to 0.01 mass %, particularly preferably from 0.003 to 0.007 mass %, based on PTFE. An aqueous dispersion of purified PTFE having an APFO concentration lower than 0.001 mass % is instable and likely to agglomerate in the column, and an aqueous dispersion of purified PTFE having an APFO concentration higher than 0.02 mass % is unfavorable in view of environmental effects.

In the present invention, as a weak basic AER, resin particles made of a crosslinked styrene-divinylbenzene resin, a crosslinked acryl-divinylbenzene resin or a cellulose resin may be used, and a crosslinked styrene-divinylbenzene resin having amino groups as ion exchange groups is preferred. The weak basic AER has primary to tertiary amino groups, preferably secondary to tertiary amino groups, particularly preferably tertiary amino groups, as the ion exchange groups.

In contrast, a strong basic AER is unfavorable because being an ion exchange resin having quaternary ammonium salts as the exchange groups, it absorbs anionic components so strongly that it tends to deposit PTFE on the surface by reacting with the terminal —COOH group of PTFE and becomes unable to remove APFO in a relatively short time. A strong basic anion exchange resin is also unfavorable because it is too absorptive for APFO to efficiently elute APFO with an eluent such as an aqueous alkali solution or an aqueous alkali solution in combination with a water-miscible organic solvent. Further, whereas a strong basic AER having chloride ions as counterions has to be flushed with an aqueous alkali solution before use for removal of chlorine, a weak basic AER does not need alkali treatment once converted to the OH form, and, therefore, is used conveniently.

The weak basic AER preferably has an average particle diameter of from 0.1 to 2 mm, preferably from 0.2 to 1 mm, particularly preferably from 0.3 to 0.8 mm. The weak basic AER particles are preferred to be uniform to prevent clogging of the flow channel during the passage. The weak basic AER is preferably porous, particularly a highly crosslinked porous or microporous resin.

Specifically speaking, commercial products such as DIAION (registered trademark) WA-30 manufactured by Mitsubishi Chemical, Lewatit (registered trademark) MP-62WS manufactured by LANXESS and DOWEX MARATHON (registered trademark) WBA manufactured by Dow may be used.

In the present invention, the linear velocity in the column is from 0.1 to 2 mm/sec, preferably from 0.2 to 1.5 mm/sec, particularly preferably from 0.25 to 1.5 mm/sec. If the linear velocity in the column is less than 0.1 mm/sec, PTFE fine particles tend to agglomerate in the column, and APFO is hardly removed. If it is larger than 2 mm/sec, APFO is hardly removed probably because the APFO absorbed by the weak basic AER slowly diffuses inward from the surfaces. Herein, the linear velocity is defined as the volumetric flow per hour divided by the sectional area of the column.

In the present invention, the contact time between the crude aqueous dispersion of PTFE and the weak basic AER is from 0.2 to 4.0 hours, preferably from 0.25 to 2.0 hours, particularly preferably from 0.3 to 1.2 hours. If the contact time is shorter than 0.2 hour, APFO cannot be removed efficiently. If the contact time is longer than 4.0 hours, APFO is removed excessively enough to destabilize the dispersion, and PTFE tends to agglomerate in the column.

Thus, there are certain flow conditions for the column packed with the weak basic AER, and the flow in the column packed with the weak basic AER stabilizes under the optimal flow conditions.

In the present invention, the pH of the aqueous dispersion of purified PTFE is used as the indicator of ion exchange capacity of the weak basic AER, and when the pH decreases to 7 or below, it is considered that the ion exchange capacity has deteriorated. When APFO is removed from a crude aqueous dispersion of PTFE having a pH of from 2 to 6, the pH rises to more than 7-10. When the ion exchange capacity of the weak basic AER has absorbed too much APFO and deteriorated in ion exchange capacity, the pH at the outlet of the column lowers to 7 or below. On the basis of this fact, the pH of the aqueous dispersion of purified PTFE is measured continuously or intermittently to be used as the indicator of the ion exchange capacity.

The rise in the pH of the aqueous dispersion of purified PTFE is supposedly attributable to liberation of the cationic components of APFO such as ammonia.

Measurement of the APFO concentration in the aqueous dispersion of purified PTFE by LC-MS (high performance liquid chromatography-mass spectrometry) and the like may be accurate, but is not easy because it requires pretreatment and a lot of time. Therefore, it is practical to measure pH as in the present invention.

It is possible to use only one column packed with the weak basic AER, but it is preferred to use plural columns connected in tandem as a column sequence. A tandem column sequence of plural columns preferably comprises from 2 to 10 columns, more preferably from 2 to 6 columns, particularly preferably from 2 to 4 columns. With a column sequence of fewer columns, the advantage of higher APFO absorption efficiency is not obtained. If too many columns are used, it is cumbersome to change columns. Columns are connected in tandem by connecting the upper outlet of the first column upstream to the lower inlet of the second column via a tube or the like and connecting the subsequent columns similarly. The dispersion may be fed to plural tandem column sequences each comprising plural columns which are connected in parallel.

When the pH of the aqueous dispersion of purified PTFE from the outlet of the last column becomes 7 or below while the crude aqueous dispersion of PTFE is fed to a tandem sequence of plural columns, the absorption of APFO by the weak basic AER can be increased by removing the first column, installing a new column as the last column, and feeding the dispersion. As the column upstream to be removed, at least the first column from upstream is preferably removed, or at least two columns from upstream may be removed.

The ion exchange capacity of the weak basic AER decreases as it absorbs APFO, and eventually, it becomes necessary to change columns. The weak basic AER upstream of the column has already absorbed so much APFO and is no longer absorptive for APFO, whereas the weak basic AER downstream of the column has absorbed little APFO. Therefore, the overall APFO absorption can be increased by, among plural columns, removing the one installed upstream which has absorbed much APFO and installing a new column as the last column and continuing to pass the dispersion. Further, the APFO concentration in the resulting aqueous dispersion of purified PTFE can be adjusted easily by changing the number of columns to be connected.

The total packing length of the weak basic AER in the columns is from 0.2 to 10 m, preferably from 0.4 to 5 m, particularly preferably from 0.6 to 3 m. If the total packing length is shorter than 0.2 m, APFO can not removed sufficiently, and if the total length is longer than 10 m, the pressure loss is so large and the volumetric flow decreases.

The length of each column may be arbitrary, but is preferably from 0.2 to 5.0 m, more preferably from 0.3 to 2.0 m, particularly preferably from 0.3 to 1.0 m. With respect to the width of each column, the sectional area is from 10 to 2000 $cm^2$, preferably from 50 to 1000 $cm^2$, particularly preferably from, 100 to 500 $cm^2$. If the sectional area is less than 10 $cm^2$, the volumetric flow is small, and the production capacity is low. It is not economical that the sectional area is larger than 2000 $cm^2$.

Though any columns, whether cylindrical or prismatic, may be packed with the weak basic AER, it is convenient to use commercially available ion exchange cylinders made of FRP. Though most ion exchange cylinders are so designed that a liquid flow comes in from the upper part, and goes out from the lower part, in the present invention, the flow runs though the weak basic AER layer upward.

In the case of an upward flow, the ion exchange resin has a longer life, and the absorption of APFO increases. Conversely, in the case of a downward flow, the flow tends to drift and forms PTFE agglomerates, and thereby, the APFO absorption decreases.

The columns are kept standing at an angle of at least 45°, preferably at least 80°, particularly preferably at least 85°, to a horizontal plane, during use. It is not preferred to lay them down because the flow tends to drift.

The AER is packed to from 40 to 80%, preferably from 50 to 70%, particularly preferably from 55 to 65%, of the column volume, on the basis of the volume before the dispersion is supplied, because it swells in volume upon absorption of APFO.

In the present invention, as a pressurizing means which generates no substantial shearing force, the crude aqueous dispersion of PTFE may be pressurized from a tank placed from 1 to 10 m higher than the columns by the hydrostatic pressure resulting from the liquid head difference or pressurized in a closed vessel by introducing air. However, it is preferred to pressurize the dispersion by using the liquid head difference. The pressure difference is from 0.01 to 10 MPa, preferably from 0.02 to 0.5 MPa, particularly preferably from 0.03 to 0.1 MPa, to attain a stable flow.

Ordinary pumps which feed liquid by pressurization such as rotary pumps, bellows pumps, electromagnetic pumps and plunger pumps are not preferable because they generate shearing force enough to form agglomerates of PTFE which clog the columns during operation.

In the present invention, APFO can be eluted from the resulting weak basic AER containing APFO at a high concentration by known methods disclosed in JP-A-2001-62313 and the like.

The aqueous dispersion of purified PTFE obtained by the process of the present invention can be used itself in some cases or may be concentrated by known concentration processes.

For the concentration, centrifugal sedimentation, electrophoresis, phase separation and other known methods are available, as disclosed in Handbook of Fluorine resins, p. 32 (Non-patent document 1, edited by Takaomi Satokawa, published by Nikkankogyo Shimbun).

The removal of APFO reduces the stability of the aqueous dispersion of purified PTFE and the concentration rate. To improve the stability and the concentration rate, from 0.01 to 0.3 mass %, preferably from 0.02 to 0.25 mass %, based on PTFE, of an anionic surfactant other than APFO, such as ammonium laurylate, ethanolamine laurylate, ammonium cinnamate, ammonium lauryl sulfate, triethanolamine lauryl sulfate, ammonium p-t-butylbenzoate, may be added before or after the concentration.

After the concentration, the resulting high concentration aqueous dispersion of PTFE having a PTFE concentration of from 60 to 75 mass % may be used directly or after diluted with water, or, if necessary, may be blended with additional nonionic surfactants and anionic surfactants other than APFO, various other known ingredients such as leveling agents, antiseptic agents, coloring agents, fillers, organic solvents, ammonia and other alkaline substances to make an aqueous dispersion of PTFE having a PTFE concentration of from 55 to 70 mass % and a surfactant concentration of from 2.5 to 12 mass % based on PTFE.

The aqueous dispersion of PTFE has many uses in various conventional fields, for example, for electronic materials such as printed boards, roofing materials for membranous buildings and surface coatings for cooking utensils, and as PTFE fibers after spinning, binders for active materials in batteries and additives for plastics.

EXAMPLES

Now, the present invention will be described in further detail with reference to Examples and Comparative Examples, but these will by no means restrict the present invention. Examples 1 to 3 and Examples 7 to 8 are Working Examples, and Examples 4 to 6 and Example 9 are Comparative Examples.

An evaluation method for each item will be shown below.

(A) The average molecular weight of PTFE: It was obtained from a latent heat measured by differential calorimetry in accordance with the method by Suwa et al. (described in J. Appl. Polym. Sci, 17, 3253 (1973)).

(B) The average particle diameter of PTFE: After drying, an aqueous PTFE dispersion was photographed at a magnification of 10000 by using a scanning electron microscope, and the average value was obtained.

(C) PTFE concentration and surfactant concentrations: Approximately 10 g of a dispersion sample was put in an aluminum plate of a known mass and weighed after an hour of dehydration at 120° C. and after 35 minutes of thermal decomposition of the surfactant at 380° C., and the PTFE concentration and the surfactant concentrations based on PTFE were calculated. In the present invention, the surfactant concentration was calculated by including APFO and other thermal decomposition products.

(D) APFO concentration: APFO aqueous solutions having known concentrations were analyzed by LCMS (high performance liquid chromatography-mass spectrometry), and peak areas were plotted to make a calibration curve. Then, 50 g of an aqueous dispersion of PTFE was dried at 70° C. for 16 hours, and APFO was extracted with ethanol, and from the LCMS peak area of the extract, the APFO concentration in the sample was determined by using the calibration curve.

(E) pH: It was measured by the glass electrode method.

(F) Linear velocity: The linear velocity was calculated by dividing the elution volume per unit time by the sectional area of the column.

(G) Contact time: The contact time was obtained by dividing the packing length of AER by the linear velocity.

(H) APFO absorption (%) based on the theoretical capacity: The difference between the APFO concentration in a crude aqueous dispersion of PTFE and the APFO concentration in the resulting aqueous dispersion of purified PTFE was multiplied by the feed volume to obtain the mass APFO absorption (g), and the mass APFO absorption was divided by the formula weight of APFO, 431, to obtain the molar APFO absorption. The molar APFO absorption was divided by the AER packing volume and the theoretical capacity, to obtain the APFO absorption (%) based on the theoretical capacity.

(I) Elution ratio (%): After passage of the dispersion, the AER in the columns was washed, sampled evenly and stirred for 1 hour with 10 times as much of an eluent consisting of 10 parts by mass of 10 mass % KOH and 90 parts by mass of ethanol, and the resulting eluent containing APFO was diluted. The APFO concentration was measured by LC-MS, and the eluted APFO mass (%) per unit volume of the AER was calculated. Further, the average eluted APFO mass (%) for each column was divided by the APFO absorption based on the theoretical capacity to obtain the elution ratio (%).

Example 1

Emulsion polymerization was carried out in the presence of ammonium perfluorooctanoate as APFO preliminary added in an amount of 0.214 mass % based on the resulting PTFE and disuccinyl peroxide as a polymerization initiator to obtain an aqueous PTFE polymer emulsion having a PTFE concentration of about 26 mass %, an average particle diameter of 0.25 μm and an average molecular weight of about 3,000,000. The aqueous PTFE polymer emulsion was blended with 3.2 mass %, based on PTFE, of the nonionic surfactant (product named "NEWCOAL 1308FA" manufactured by Nippon Nyukazai, molecular formula $C_{13}H_{27}$—$(OC_2H_4)_8$—$OCH(CH_3)CH_2$—$OH$, molecular weight 610) and ion exchanged water to make a crude aqueous dispersion of PTFE having a PTFE concentration of 25 mass % and a pH of 3.4.

The weak basic AER (A) (crosslinked styrene-divinylbenzene resin having tertiary amine exchange groups in the OH form, manufactured by LANXESS, product name "Lewatit (registered trademark) MP-62WS", average particle diameter 0.5 mm, ion exchange capacity 1.7 eq/L) was packed into two columns (product name "ion exchange resin column G-20B" manufactured by ORGANO, cylinders having an inner diameter of 200 mm, a sectional area of 314 mm², a length of 920 mm, an internal volume of 25 L and having a composite structure consisting of an FRP outer wall and an ABS inner wall) in an amount of 15 L, respectively, to make two packed columns. The total length of the two columns was 955 mm, and the packing rate before supply of the dispersion was 60%. The two packed columns were set vertically side-by-side, and the upper outlet of the first column was connected to the lower inlet of the second column via a braided hose. The columns were washed by passing ion exchanged water upward at a flow rate of 60 L per hour for 2 hours and drained.

Then, the crude aqueous dispersion of PTFE was passed through the columns upward from a tank placed from 5 to 6 m up above the columns at a rate of 60 L per hour at a linear velocity of 0.53 mm/sec by using the pressure resulting from the head difference with valve control (with a pressure of 0.06 to 0.07 MPa on the columns). When the crude aqueous dispersion of PTFE was fed for 200 hours, the pH of the aqueous dispersion of purified PTFE had lowered to 6.7 from 8.8 at the beginning of the feeding, and the feeding was stopped.

The APFO concentrations of the aqueous dispersion of purified PTFE from the outlet of the columns at the beginning of the feeding and after the feeding and the APFO concentration of 12 kL of the resulting aqueous dispersion of purified PTFE were measured and found to be 0.0010 mass %, 0.0112 mass % and 0.0048 mass %, respectively.

From the values, the APFO absorption by AER was calculated at 7.2 kg, and the absorption based on the theoretical capacity was calculated at 32.8%.

The APFO concentration in the AER was measured, and the APFO absorption based on the theoretical capacity for the first column was calculated at 50.2%, and the APFO absorption based on the theoretical capacity and the elution ratio for second column were calculated at 11.2% and 93.5%, respectively.

Example 2

A crude aqueous dispersion of PTFE was fed in the same manner as in Example 1 except that the flow rate was 30 L per hour. When the pH of the aqueous dispersion of purified PTFE from the outlet of the column had lowered to 6.9 from 9.2 at the beginning of the feeding, the feeding was stopped, and the aqueous dispersion of purified PTFE was obtained in an amount of 12 kL. The measured values are shown in Table 1.

Example 3

A crude aqueous dispersion of PTFE was fed to three columns packed with the same amount of AER as in Example 1 connected in tandem in the same manner as in Example 1 except that the crude aqueous dispersion of PTFE contained 15 mass % of the nonionic surfactant (b) (product name "Triton (registered trademark) X-100" manufactured by Dow, molecular formula $C_8H_{17}$—$C_6H_4$—$(OC_2H_4)_{10}$—OH, molecular weight 646) instead of the nonionic surfactant (a), and the flow rate was 135 L per hour. As a result, 22.3 kL of an aqueous dispersion of purified PTFE was obtained. The measured values are shown in Table 1.

Example 4

A crude aqueous dispersion of PTFE was fed to a column packed with the same amount of AER as in Example 1 at a flow rate of 3 L per hour. When 0.18 kL of the dispersion had been fed, the feeding was stopped because the pH of the aqueous dispersion of purified PTFE from the column outlet had decreased to 6.2.

The column was opened and found to contain many white agglomerates of PTFE. This probably indicates that the feed rate was so low that PTFE agglomerated, and that because the flow direction was downward, the flow drifted so as to prevent absorption of APFO. The measured values are shown in Table 1.

Example 5

A crude aqueous dispersion of PTFE was passed through two columns packed with the same amount of AER as in Example 1 connected in tandem at a flow rate of 300 L per hour. When 1.5 kL of the dispersion had been fed, the feeding was stopped because the pH of the aqueous dispersion of purified PTFE from the column outlet had decreased. Absorption of APFO was insufficient probably because the feed rate was too high, and the flow direction was downward. The measured values are shown in Table 1.

Example 6

The strong basic AER (B) (product name "Lewatit (registered trademark) MP600WS" having quaternary ammonium salt exchange groups, manufactured by LANXESS, ion exchange capacity 1.15 eq/L,) was packed into two columns, and the two columns were connected in tandem. The resulting column sequence was washed with 120 L of 1N aqueous potassium hydroxide over 1 hour and then with ion exchanged water for 6 hours and drained. A crude aqueous dispersion of PTFE was passed through the column sequence upward in the same manner as in Example 1. When 4500 L of the crude aqueous dispersion of PTFE had been fed, the feeding was stopped because the pH of the aqueous dispersion of purified PTFE from the column outlet had decreased to 6.0, and the APFO concentration had increased.

The resulting aqueous dispersion of purified PTFE has such an APFO concentration as 0.0216 mass % based on PTFE and was unfavorable.

The column was opened, and many white agglomerates of PTFE were observed in the strong basic AER, because of the use of the strong basic AER. The APFO elution ratio of the aqueous dispersion of purified APFO was as low as 14.5%. The measured values are shown in Table 1.

Example 7

After a crude aqueous dispersion of PTFE was fed in the same manner as in Example 1, the first column upstream was removed. The second column was put forward and connected to a new unused column installed behind, via a braided hose. Then, a crude aqueous dispersion of PTFE was passed though them upward until the pH of the aqueous dispersion of purified PTFE became 6.7 or below to obtain about 11 kL of aqueous dispersion of purified PTFE having an APFO concentration of 0.0060 mass % based on PTFE.

Example 8

1 mass %, based on PTFE, of 10 mass % aqueous solution of ammonium laurylate (containing 200 g of laurylic acid, 120 g of 28% aqueous ammonia and 1680 g of water) (corresponding to 0.1 mass %, based on PTFE, of ammonium laurylate) was added to the aqueous dispersion of purified PTFE obtained in Example 1, and the PTFE fine particles were sedimented by heat concentration at 80° C. over 30 hours. The supernatant was removed to obtain a high concentration aqueous dispersion of PTFE having a PTFE concentration of about 67.4 mass %, a surfactant concentration of 2.3 mass % based on PTFE and an APFO concentration of 0.0055 mass % based on PTFE.

The high concentration aqueous dispersion of PTFE was blended with 2.7 mass %, based on PTFE, of the same nonionic surfactant (a) as used in Example 1, 0.2 mass %, based on PTFE, of polyethylene oxide (molecular weight 500,000, manufactured by Wako Pure Chemical Industries), 0.05 mass %, based on PTFE, of 28% aqueous ammonia and water to obtain an aqueous dispersion of PTFE having a PTFE concentration of about 60.5 mass %.

Example 9

A crude aqueous dispersion of PTFE was fed by using MOHNO Pump (registered trademark) NL-15 manufactured by HEISHIN at a rate of 1 L per hour. Unfavorably, PTFE agglomerates were formed due to shearing force and clogged the columns after 6 hours.

TABLE 1

| | Item | Ex. 1 | Ex. 2 | Ex. 3 | Ex. 4 | Ex. 5 | Ex. 6 |
|---|---|---|---|---|---|---|---|
| Column | Inner diameter (mm) | 200 | 200 | 200 | 200 | 200 | 200 |
| | Cylinder volume (L) | 25 | 25 | 25 | 25 | 25 | 25 |
| Weak basic AER | Kind | (A) | (A) | (A) | (A) | (A) | (B) |
| | Theoretical capacity (eq/L) | 1.7 | 1.7 | 1.7 | 1.7 | 1.7 | 1.15 |
| | Amount of resin per column (L) | 15 | 15 | 15 | 15 | 15 | 15 |
| | Packing volume (%) | 60 | 60 | 60 | 60 | 60 | 60 |

TABLE 1-continued

| Item | | Ex. 1 | Ex. 2 | Ex. 3 | Ex. 4 | Ex. 5 | Ex. 6 |
|---|---|---|---|---|---|---|---|
| Number of columns | | Two column in tandem | Two column in tandem | Three column in tandem | One column | Two column in tandem | Two column in tandem |
| Total | Packing volume (L) | 30 | 30 | 45 | 15 | 30 | 30 |
| | Total packing length (mm) | 955 | 955 | 1433 | 478 | 955 | 955 |
| Crude aqueous dispersion of PTFE | PTFE concentration (%) | 25.0 | 25.0 | 25.0 | 25.0 | 25.0 | 25.0 |
| | Nonionic surfactant | (a) | (a) | (b) | (a) | (a) | (a) |
| | concentration (%/PTFE) | 3.2 | 3.2 | 15.0 | 3.2 | 3.2 | 1.7 |
| | APFO concentration (%/PTFE) | 0.214 | 0.214 | 0.214 | 0.214 | 0.214 | 0.214 |
| | PH | 3.4 | 3.4 | 3.4 | 3.4 | 3.4 | 3.4 |
| Flow conditions and clogging | Flow direction | Upward | Upward | Upward | Downward | Downward | Downward |
| | Flow rate (L/H) | 60 | 30 | 135 | 3 | 300 | 30 |
| | Flow time (H) | 200 | 400 | 165 | 60 | 5 | 150 |
| | Flow volume (L) | 12000 | 12000 | 22275 | 180 | 1500 | 4500 |
| | Linear velocity (mm/sec) | 0.53 | 0.27 | 1.19 | 0.03 | 2.65 | 0.27 |
| | Contact time (H) | 0.5 | 1.0 | 0.33 | 5.0 | 0.10 | 1.0 |
| | Clogging of column | No clogging | No clogging | No clogging | Clogging | No clogging | Clogging |
| PH and APFO concentration at column outlet | Initial pH | 8.9 | 9.2 | 9.1 | 8.8 | 9.2 | 9.2 |
| | Initial APFO concentration (%/PTFE) | 0.0010 | 0.0008 | 0.0021 | 0.0099 | 0.0056 | 0.0025 |
| | Final pH | 6.7 | 6.9 | 6.8 | 6.2 | 6.2 | 6.0 |
| | Final APFO concentration (%/PTFE) | 0.0112 | 0.0098 | 0.0088 | 0.0755 | 0.0491 | 0.0546 |
| Aqueous dispersion of purified PTFE | PTFE concentration (%) | 25.0 | 24.9 | 25.0 | 24.4 | 25.0 | 24.3 |
| | PTFE recovery (kg) | 3450 | 3436 | 6404 | 51 | 531 | 1258 |
| | APFO concentration (%/PTFE) | 0.0048 | 0.0034 | 0.0061 | 0.0175 | 0.0155 | 0.0216 |
| | pH | 8.8 | 8.9 | 8.7 | 8.3 | 8.5 | 8.5 |
| Removed APFO (g) | | 7217 | 7237 | 13314 | 99 | 856 | 2419 |
| Removed APFO (mol) | | 16.8 | 16.8 | 30.9 | 0.23 | 1.99 | 5.61 |
| APFO absorption based on theoretical capacity (%) | | 32.8 | 32.9 | 45.8 | 0.9 | 3.9 | 16.3 |
| APFO elution from AER after use | APFO elution from the first column (%) | 50.2 | 55.3 | 75.5 | 0.2 | 2.2 | 2.6 |
| | APFO elution from the second column (%) | 14.8 | 9.8 | 46.3 | — | 1.8 | 2.1 |
| | APFO elution from the third column (%) | — | — | 12.2 | — | — | — |
| | Average APFO elution (%) | 30.7 | 32.1 | 44.2 | 0.2 | 2.0 | 2.4 |
| | Elution ratio (%) | 93.5 | 97.4 | 96.7 | 22.1 | 51.4 | 14.5 |

INDUSTRIAL APPLICABILITY

The aqueous dispersion of purified PTFE of the present invention can be used directly or after concentrated and blended arbitrarily, and has many uses for electronic materials such as printed boards, roofing materials for membranous buildings and surface coatings for cooking utensils, and as PTFE fibers after spinning, dust prevention use, binders for active materials in batteries and additives for plastics.

The entire disclosure of Japanese Patent Application No. 2005-239062 filed on Aug. 19, 2005 including specification, claims, drawings and summary is incorporated herein by reference in its entirety.

The invention claimed is:

1. A process for producing an aqueous dispersion of purified polytetrafluoroethylene, which comprises passing a crude aqueous dispersion of polytetrafluoroethylene comprising from 10 to 50 mass % of polytetrafluoroethylene fine particles having an average particle diameter of from 0.1 to 0.5 μm, from 0.05 to 1.0 mass %, based on polytetrafluoroethylene, of a fluorine-containing carboxylic acid salt represented by the formula (1) and from 2 to 20 mass %, based on polytetrafluoroethylene, of a nonionic surfactant represented by the formula (2) and/or the formula (3) through a column packed with a weak basic anion exchange resin upward at a linear velocity of 0.1 to 2 mm/sec with a contact time of 0.2 to 4 hours to reduce the content of the fluorine-containing carboxylic acid salt:

formula (1): $R^1$—COOX (wherein $R^1$ is a $C_{5-9}$ alkyl group having fluorine atoms instead of from 90 to 100% of the hydrogen atoms (which may contain from 1 to 2 ether oxygen atoms), and X is an ammonium ion);

formula (2): $R^2$—O—A—H (wherein $R^2$ is a $C_{8-18}$ alkyl group, and A is a polyoxyalkylene chain consisting of from 5 to 20 oxyethylene groups and from 0 to 2 oxypropylene groups); and formula (3): $R^3$—$C_6H4$—O—B—H (wherein $R^3$ is a $C_{4-12}$ alkyl group, and B is a polyoxyalkylene chain consisting of from 5 to 20 oxyethylene groups).

2. The process for producing an aqueous dispersion of purified polytetrafluoroethylene according to claim 1, wherein the content of the fluorine-containing carboxylic acid salt in the aqueous dispersion of purified polytetrafluoroethylene is from 0.001 to 0.02 mass % based on polytetrafluoroethylene.

3. The process for producing an aqueous dispersion of purified polytetrafluoroethylene according to claim 1, wherein the fluorine-containing carboxylic acid salt represented by the formula (1) is an ammonium perfluorocarboxylate.

4. The process for producing an aqueous dispersion of purified polytetrafluoroethylene according to claim 1, wherein the nonionic surfactant represented by the formula (2) is present and $R^2$ is a $C_{12-16}$ alkyl group, and A is a hydrophilic polyoxyalkylene chain consisting of from 7 to 12 oxyethylene groups and from 0.5 to 1.5 oxypropylene groups.

5. The process for producing an aqueous dispersion of purified polytetrafluoroethylene according to claim 1, wherein the nonionic surfactant represented by the formula (3) is present and $R^3$ is a $C_{6-10}$ alkyl group, and B as a hydrophilic group consists of from 7 to 12 oxyethylene groups.

6. The process for producing an aqueous dispersion of purified polytetrafluoroethylene according to claim 1, wherein the fluorine-containing carboxylic acid salt represented by the formula (1) is $C_7F_{15}COONH_4$.

7. The process for producing an aqueous dispersion of purified polytetrafluoroethylene according to claim 1, wherein the crude aqueous dispersion of polytetrafluoroethylene is supplied to the column at a pressure of from 0.01 to 1 MPa by a pressurizing means which generates no substantial shearing force.

8. The process for producing an aqueous dispersion of purified polytetrafluoroethylene according to claim 1, wherein the weak basic anion exchange resin is a resin particle made from a crosslinked acryl-divinylbenzene or a cellulose resin.

9. The process for producing an aqueous dispersion of purified polytetrafluoroethylene according to claim 1, wherein the weak basic anion exchange resin is a resin particle made from a crosslinked acryl-divinylbenzene having amino groups as ion exchange groups.

10. The process for producing an aqueous dispersion of purified polytetrafluoroethylene according to claim 1, wherein the weak basic anion exchange resin is a resin particle made from a crosslinked acryl-divinylbenzene having primary to tertiary amino groups as ion exchange groups.

11. The process for producing an aqueous dispersion of purified polytetrafluoroethylene according to claim 1, wherein the crude aqueous dispersion of polytetrafluoroethylene has a pH of from 2 to 6.

12. The process for producing an aqueous dispersion of purified polytetrafluoroethylene according to claim 1, wherein the purified aqueous dispersion of polytetrafluoroethylene has a pH of from 7 to 10.

13. The process for producing an aqueous dispersion of purified polytetrafluoroethylene according to claim 1, wherein the crude aqueous dispersion of polytetrafluoroethylene is passed through plural columns connected in tandem, and when the pH of the aqueous dispersion of purified polytetrafluoroethylene from the last column becomes 7 or below, the first column is removed, and a new column is installed as the last column, and then the crude aqueous dispersion of polytetrafluoroethylene is passed through the tandem of plural columns.

14. The process for producing an aqueous dispersion of purified polytetrafluoroethylene according to claim 13, wherein the number of plural columns connected in tandem is from 2 to 10.

* * * * *